United States Patent
Barsness et al.

(10) Patent No.: US 10,037,389 B2
(45) Date of Patent: *Jul. 31, 2018

(54) DYNAMIC WINDOW ADJUSTMENTS IN A STREAMING ENVIRONMENT

(71) Applicant: International Business Machines Corporation, Armonk, NY (US)

(72) Inventors: Eric L. Barsness, Pine Island, MN (US); Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 114 days.

This patent is subject to a terminal disclaimer.

(21) Appl. No.: 14/804,547

(22) Filed: Jul. 21, 2015

(65) Prior Publication Data

US 2017/0026467 A1    Jan. 26, 2017

(51) Int. Cl.
*G06F 17/30* (2006.01)
*H04L 12/24* (2006.01)

(52) U.S. Cl.
CPC .. *G06F 17/30958* (2013.01); *G06F 17/30516* (2013.01); *G06F 17/30557* (2013.01); *H04L 41/0893* (2013.01); *H04L 41/22* (2013.01); *H04L 41/0604* (2013.01); *H04L 41/0681* (2013.01)

(58) Field of Classification Search
USPC .......................................... 709/223
See application file for complete search history.

(56) References Cited

U.S. PATENT DOCUMENTS

| 7,739,331 | B2 | 6/2010 | Gu et al. |
| 8,549,169 | B2 | 10/2013 | Branson et al. |
| 8,768,956 | B2 | 7/2014 | Kashiyama |
| 2011/0055239 | A1 | 3/2011 | Wolf et al. |
| 2014/0095529 | A1 | 4/2014 | Deshmukh et al. |
| 2015/0081707 | A1 | 3/2015 | Branson et al. |

OTHER PUBLICATIONS

Deypir et al "towards a variable size sliding window model for frequent itemset mining over data streams" Computers & Industrial Engineering vol. 63, Issue 1, Aug. 2012, pp. 161-172 http://www.sciencedirect.com/science/article/pii/S0360835212000563.*

(Continued)

*Primary Examiner* — Patrice L Winder
*Assistant Examiner* — Abderrahmen Chouat
(74) *Attorney, Agent, or Firm* — Robert J. Shatto

(57) ABSTRACT

A first stream operator can receive a first tuple including a first set of attributes to be stored in a first window and a second tuple including a second set of attributes to be stored in a second window. The first window and the second window can each have an eviction policy. In response to triggering the eviction policy for the first window and the second window, the first tuple stored in the first window can be compared with the second tuple stored in the second window. Based upon the comparing, it can be determined that the first tuple and the second tuple go outside of a join threshold. In response to determining that the first tuple and the second tuple go outside of a join threshold, the eviction policy of the first window can be altered.

20 Claims, 7 Drawing Sheets

(56) References Cited

OTHER PUBLICATIONS

Gedik, Buğgra, Kun-Lung Wu, Philip S. Yu, and Ling Liu. "Adaptive load shedding for windowed stream joins." In Proceedings of the 14th ACM international conference on Information and knowledge management, Oct. 31, 2005 pp. 171-178. ACM.*
Accelerated Examination Support Document, U.S. Appl. No. 15/349,081. Aug. 25, 2016. 9 pgs.
List of IBM Patents or Patent Applications Treated as Related, Oct. 24, 2016. 2 pgs.
Barsness et al., "Dynamic Window Adjustments in a Streaming Environment", U.S. Appl. No. 15/349,081, filed Nov. 11, 2016.
Deypir et al., "Towards a variable size sliding window model for frequent itemset mining over data streams", Computers and Industrial Engineering, vol. 63, Issue 1. Aug. 2012. http://www.sciencedirect.comiscience/article/pii/S0360835212000563 DOI:10.1016/j.cie.2012.02.008 3 pages.
Gedik et al., "Adaptive Load Shedding for Windowed Stream Joins", IBM Research Report RC23684 (W0508-015) Aug. 2, 2005. 19 pages.
Kulkarni et al., "iJoin: Importance-aware Join Approximation over Data Streams", Proceedings of the 20th international conference on Scientific and Statistical Database Management, Jul. 2008. Springer-Verlag Berlin, Heidelberg © 2008. DOI: 10.1007/978-3-540-69497-7_36. 18 pages.
Neeraja et al.,"Concept Change Aware Dynamic Sliding Window Based Frequent Itemsets Mining Over Data Streams", International Journal of Technology Enhancements and Emerging Engineering Research, vol. 2. Issue 7, ISSN 2347-4289. Copyright © 2014 IJTEEE. 4 pages.
Plale et al., "Evaluation of Rate-based Adaptivity in Asynchronous Data Stream Joins", Proceedings of the 19th IEEE International Parallel and Distributed Processing Symposium, Apr. 2005. IEEE Computer Society Washington, DC, USA © 2005. DOI: 10.1109/IPDPS.2005.205. 10 pages.
Accelerated Examination Support Document, U.S. Appl. No. 15/681,815, Aug. 7, 2017, 16 pgs.
Barsness et al., "Dynamic Window Adjustments in a Streaming Environment", U.S. Appl. No. 15/681,815, filed Aug. 21, 2017.
Accelerated Examination Support Document, U.S. Appl. No. 15/681,860, Aug. 7, 2017, 18 pgs.
Barsness et al., "Dynamic Window Adjustments in a Streaming Environment", U.S. Appl. No. 15/681,860, filed Aug. 21, 2017.
List of IBM Patents or Patent Applications Treated as Related, Dec. 13, 2017, 2 pgs.

* cited by examiner

DYNAMIC WINDOW ADJUSTMENTS IN A STREAMING ENVIRONMENT

BACKGROUND

The present disclosure relates generally to the field of stream computing, and more particularly to computing applications that receive streaming data and process the data as it is received.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Aspects of the disclosure provide a method, system, and computer program product for dynamic window adjustments in a streaming environment. The method, system, and computer program product can include receiving at a first stream operator, a first tuple including a first set of attributes to be stored in a first window and a second tuple including a second set of attributes to be stored in a second window. In various embodiments, the first window and the second window can each have an eviction policy. In response to triggering the eviction policy for the first window and the second window, the first tuple stored in the first window can be compared with the second tuple stored in the second window. Based upon the comparing, it can be determined that the first tuple and the second tuple go outside of a join threshold. In response to determining that the first tuple and the second tuple go outside of a join threshold, the eviction policy of the first window can be altered.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of typical embodiments of the invention and do not limit the invention.

Figure 1:
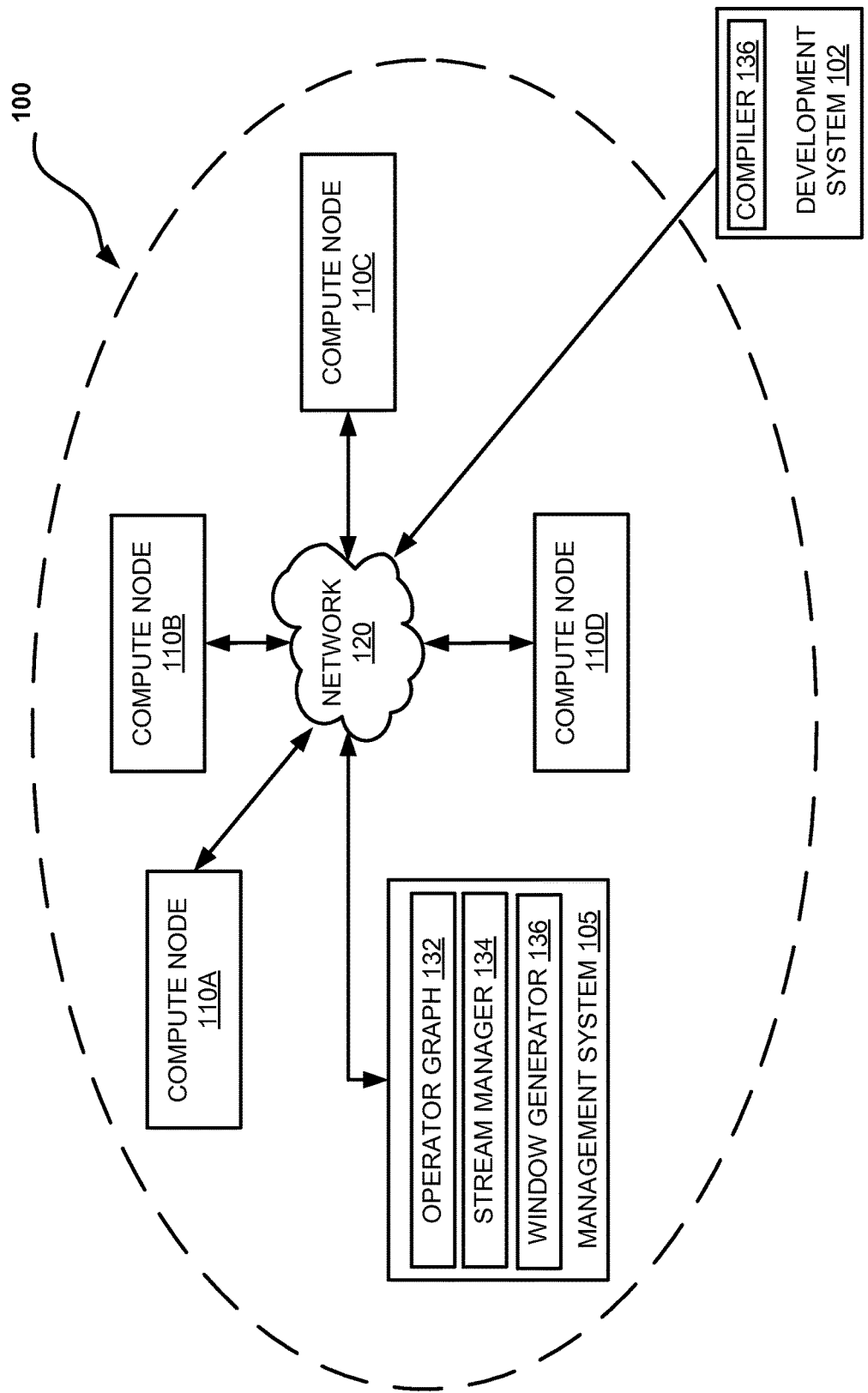
FIG. 1 illustrates a computing infrastructure configured to execute a stream computing application, according to various embodiments.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to stream computing. In embodiments, more particular aspects relate to adjusting window sizes of a stream operator. While the present disclosure is not necessarily limited to such applications, various aspects of the disclosure may be appreciated through a discussion of various examples using this context.

Stream-based computing and stream-based database computing are emerging as a developing technology for a variety of applications. For example, products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple (further defined herein) by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using some inter-process communication techniques. Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may process a received tuple within fractions of a second. Unless the stream operators are located in the same processing element, an inter-process communication path can be used each time a tuple is sent from one stream operator to another. Inter-process communication paths can be a resource in a stream computing application. According to various embodiments, the available bandwidth on one or more inter-process communication paths may be conserved. Efficient use of inter-process communication bandwidth can speed up processing.

An operator graph can be an execution path for a plurality of stream operators to process a stream of tuples. In addition to stream operators, the operator graph can refer to an execution path for processing elements and the dependent stream operators of the processing elements to process the stream of tuples. Generally, the operator graph can have a plurality of stream operators that produce a particular end result, e.g., calculate an average. An operator graph may be a linear arrangement of processing elements and/or operators, or it may include one or more distinct execution paths, also known as sub-processes, methods, or branches.

In stream computing, operator functionality exists to join data from multiple incoming streams. For example, this may be similar to joining database records from two files, except in the context of stream computing, the "joining" often occurs before data is stored. Initially, additional mechanisms were created for operator functionality so tuples could be held in the memory of an operator for a given period of time. These additional mechanisms facilitated joining multiple incoming streams and helped correlate corresponding matches from different streams. However, streaming data is not always received in the order in which it was sent (e.g., non-chronological). When data is being brought together from various sources, timing and organization issues can arise due to a lack of uniformity among the various sources.

A stream computing application may include one or more windows within a stream operator to manage the flow of tuples in specific sections of an operator graph. A "window," as referred to in this description and the claims, is a logical grouping of tuples based on one or more criteria, such as, but not limited to count, time, and delta. Delta refers to the difference in value of a given attribute between the oldest and the newest tuple in the window. In various embodiments, a window may be a tumbling or sliding window. As understood by one of skill in the art, a tumbling window is processed and emptied when the grouping condition is met, whereas in a sliding window the condition where tuples are removed from the window is defined separately from the condition triggering the operation on the tuples in the sliding window. A window may allow for the storage and/or creation of subsets or groups of tuples, and may be used to establish a set of rules that apply to the subsets or groups of tuples.

In certain embodiments, an eviction policy may determine the size of the window. For example, the eviction policy may indicate that a window will last for 5 minutes before resetting. When the eviction policy for the window is met, a stream operator may perform analysis logic and/or process tuple logic on the tuple and/or tuples stored in the window and/or windows, and then the window may reset. Such a window is an example of a tumbling window. As used herein, a "flow of tuples" refers to both the transmission of tuples between stream operators or processing elements and the creation of tuples within stream operators. The creation or transmission of a single tuple (or a single group of tuples, if created or transmitted together) is referred to as a "tuple flow event."

The eviction policy of the window may be based on a time difference between consecutive tuple flow events. For example, if 3 minutes passes between tuple flow events inside of the window, the eviction policy may be triggered and the window may reset. In certain embodiments, the eviction policy of the window may be based upon a tuple flow count. For example, when a certain amount of tuples has been stored within the window, the eviction policy may be triggered and the window may be reset. In other embodiments, the eviction policy of the window may be based on an attribute flow count. For example, when a certain amount of attributes have been stored within the window, the eviction policy may be triggered and the window may be reset.

Aspects of the present disclosure provide a method to dynamically grow and shrink the window size within a stream operator based upon user specified thresholds. In various embodiments, the method may include receiving, at a stream operator, a first tuple to be stored in a first window and a second tuple to be stored in a second window. In certain embodiments, the stream operator may have an eviction policy. As used herein, an "eviction policy" is a memory trigger applied to a window of a stream operator indicating when a stream operator will perform analysis logic and/or process tuple logic. In some embodiments, the eviction policy may dictate when tuples are stored and/or removed from a window.

In various embodiments, the method may include comparing the first tuple stored in the first window with the second tuple stored in the second window. In some embodiments, the method may include determining whether or not the first tuple and the second tuple match. As used herein, a "match" may be an indication of a level of equivalency between the first tuple and the second tuple. In certain embodiments, a match determination may include determining whether or not the first tuple and the second tuple match. Once the match determination has been performed, a stream manager may determine whether or not the match determination has met a join threshold. As used herein, a "join threshold" may be a criteria including a numerical value, a numerical range and/or a numerical percentage for triggering the eviction policy. Additionally, in various embodiments, the join threshold may determine whether or not the eviction policy requires alteration.

In various embodiments, the join threshold may be an indication as to whether or not the eviction policy requires alteration. For example, if a stream operator with an eviction policy of 5 minutes is receiving tuples from a first stream and a second stream and the join threshold for the stream operator requires tuples from the first stream to match with tuples from the second stream 90% of the time (e.g., 90 tuples from the first stream are matched with 100 tuples of the second stream), the eviction policy may be triggered when the tuples stored in one or more of the windows are matched at a percentage of 90% or when 5 minutes expires. If, continuing the example, the match percentage of tuples does not reach 90% within 5 minutes, the size of the window may be made bigger or smaller to achieve the desired join threshold of 90%.

In various embodiments, the stream operator may dynamically compare the tuple flow counts with the join threshold such that at any given point, if the percentage of tuple matches fails to reach the join threshold, the eviction policy and subsequently, the window size, may be adjusted to limit the amount of time data is collected, the counter number, the delta or limit the amount of memory required for the window. Continuing the example above where the percentage of tuples does not reach a 90% join threshold within 5 minutes, the stream operator and/or stream manager may determine a recommended eviction policy, such as a shorter eviction policy (e.g., 3 minutes) or a different join threshold percentage (e.g., 85%) to obtain a desired result. Once the recommended eviction policy is determined, the stream operator and/or stream manager may display the recommendation to the user through a graphical user interface (GUI). In certain embodiments, the stream operator and/or stream manager may automatically adjust the eviction policy and subsequently, notify the user of the alteration.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The management system 105 can include an operator graph 132, a stream manager 134, and a window generator 136, discussed further in FIG. 3. The communications network 120 may include one or more servers, networks, or databases, and may use a particular communication protocol to transfer data between the compute nodes 110A-110D. A development system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
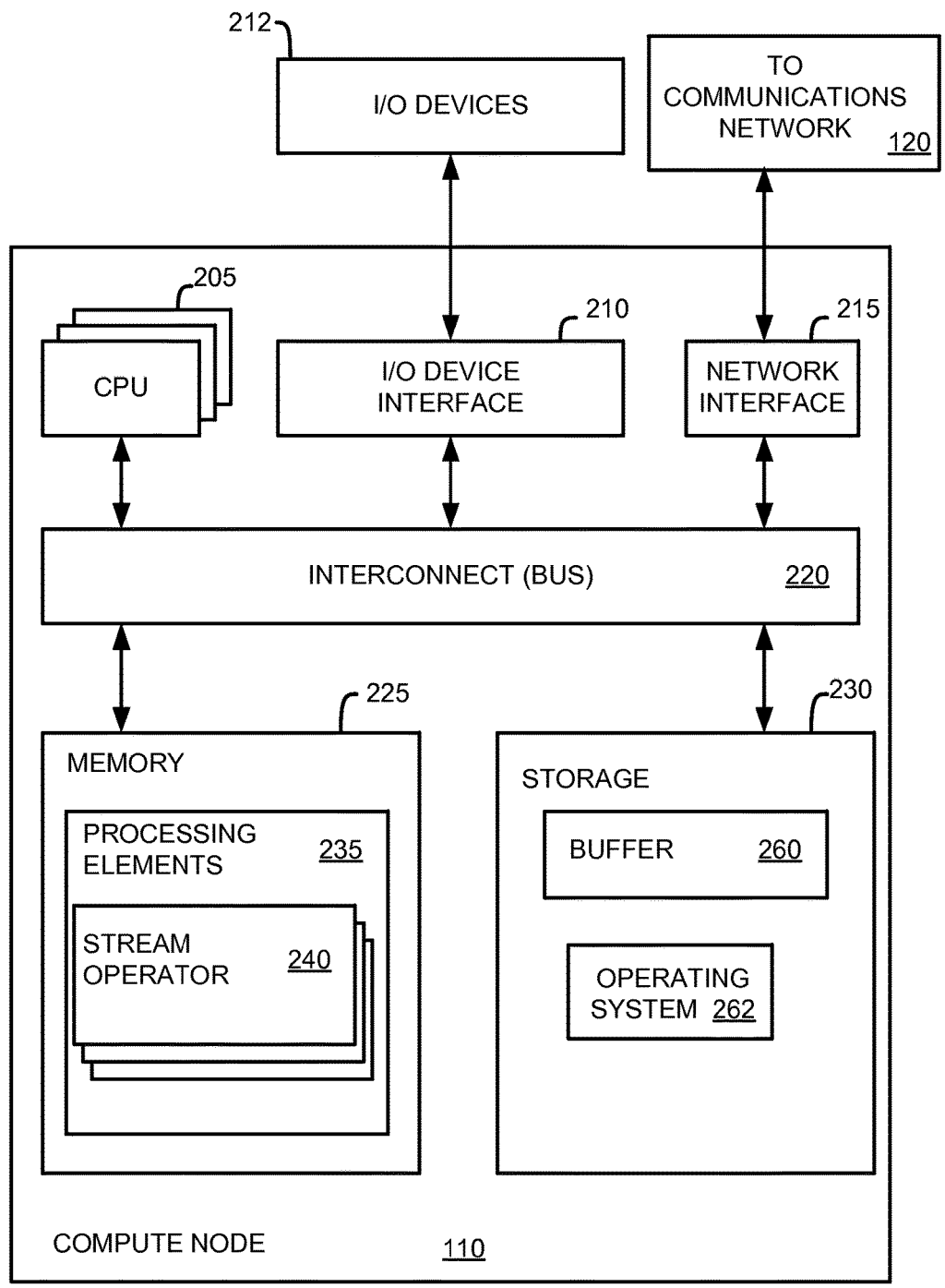
FIG. 2 illustrates a more detailed view of a compute node of FIG. 1, according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. Two or more processing elements 235 may run on the same memory 225, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
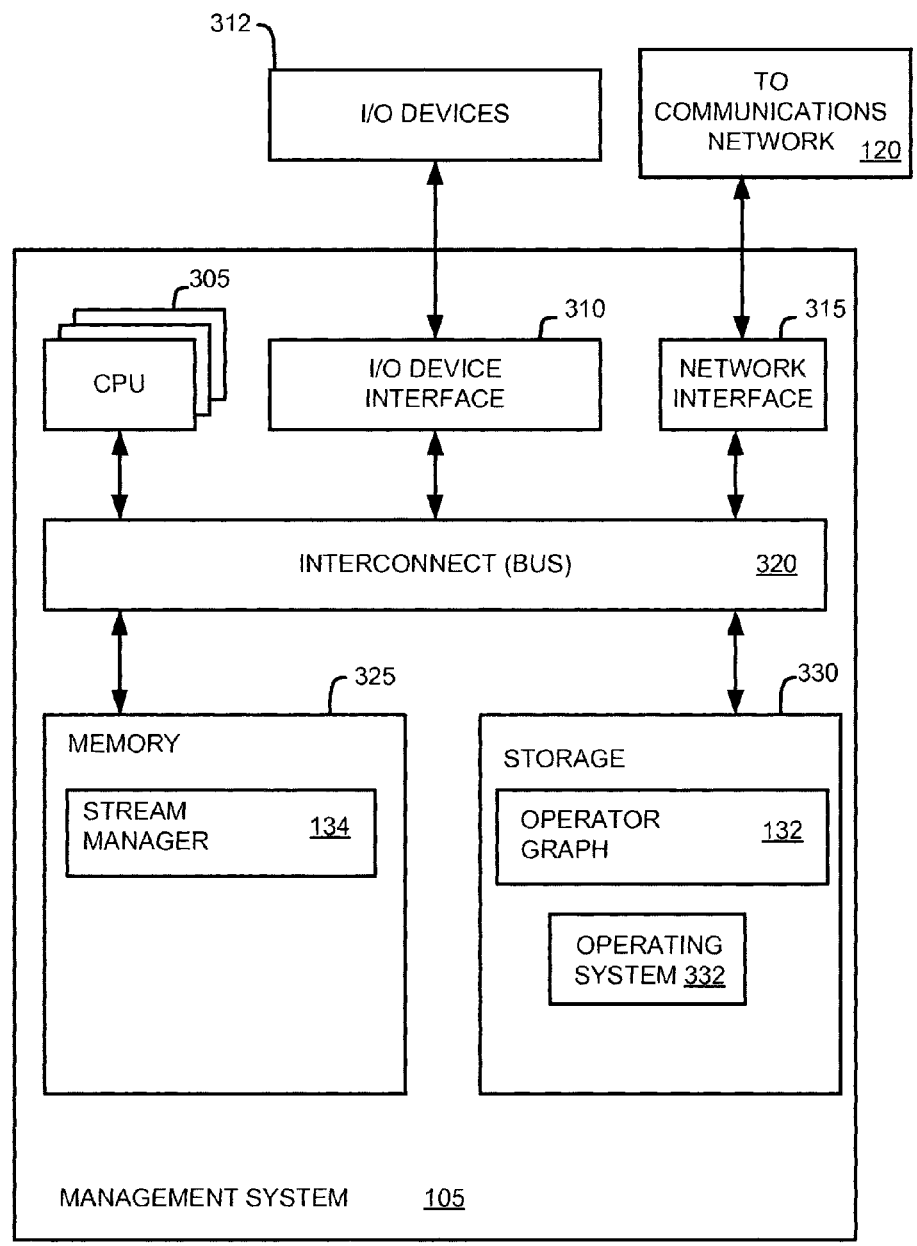
FIG. 3 illustrates a more detailed view of the management system of FIG. 1, according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. In some embodiments, the stream manager may collect memory data, discussed further herein. Additionally, the storage 330 may store an operator graph 132 and a window generator 136. The operator graph 132 may define how tuples are routed to processing elements 235 (FIG. 2) for processing. In certain embodiments, the window generator 136 may be used to define the parameters for the window and/or windows within the stream operator 240. In some embodiments, the window generator 136 may be used to collect memory data to dynamically adjust the size of the window and/or windows, discussed further herein.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
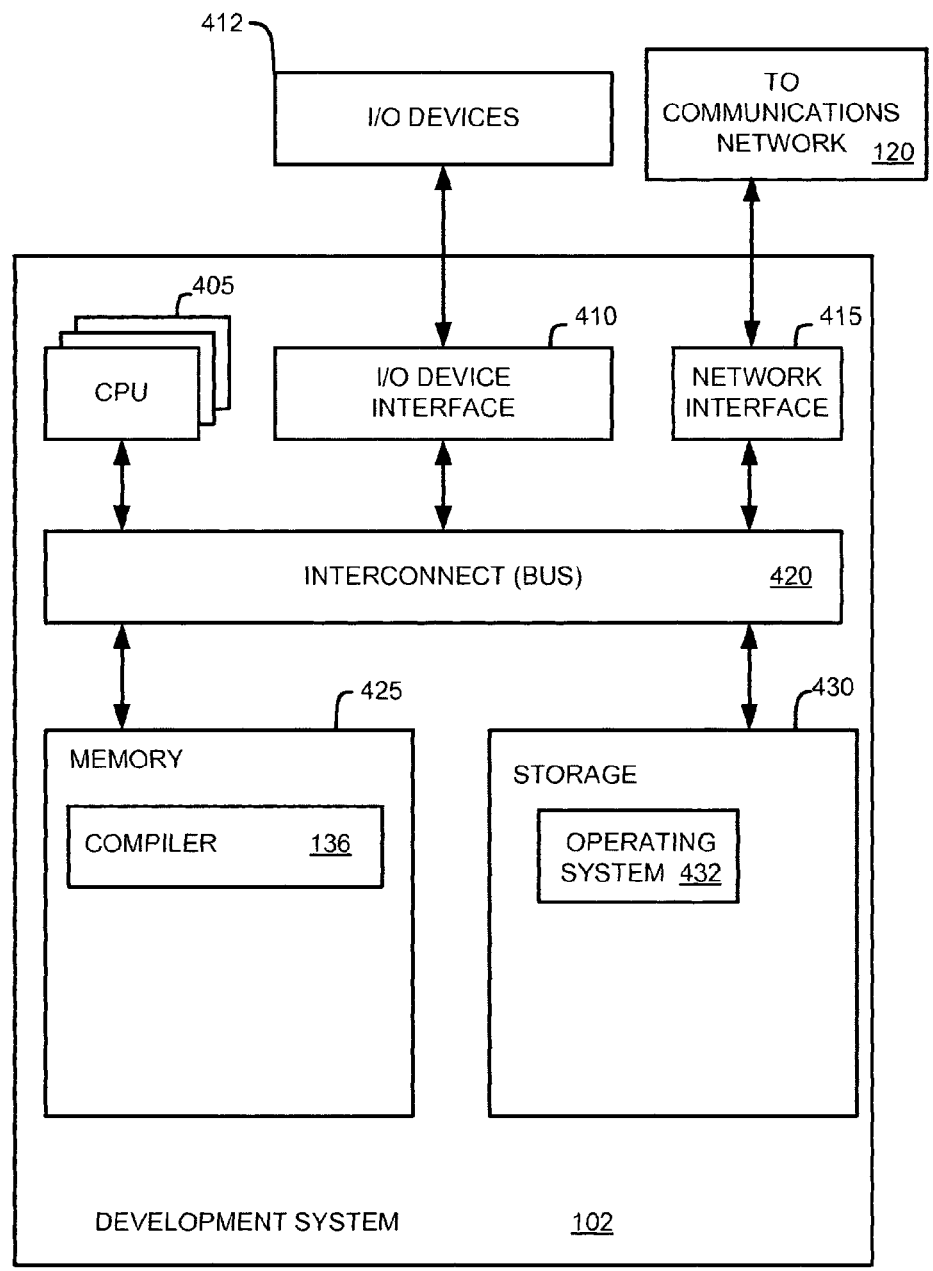
FIG. 4 illustrates a more detailed view of the development system of FIG. 1, according to various embodiments.

FIG. 4 is a more detailed view of the development system 102 of FIG. 1 according to some embodiments. The development system 102 may include, without limitation, one or more processors (CPUs) 405, a network interface 415, an interconnect 420, a memory 425, and storage 430. The development system 102 may also include an I/O device interface 410 connecting I/O devices 412, e.g., keyboard, display, and mouse devices, to the development system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The development system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 132 of FIG. 1.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
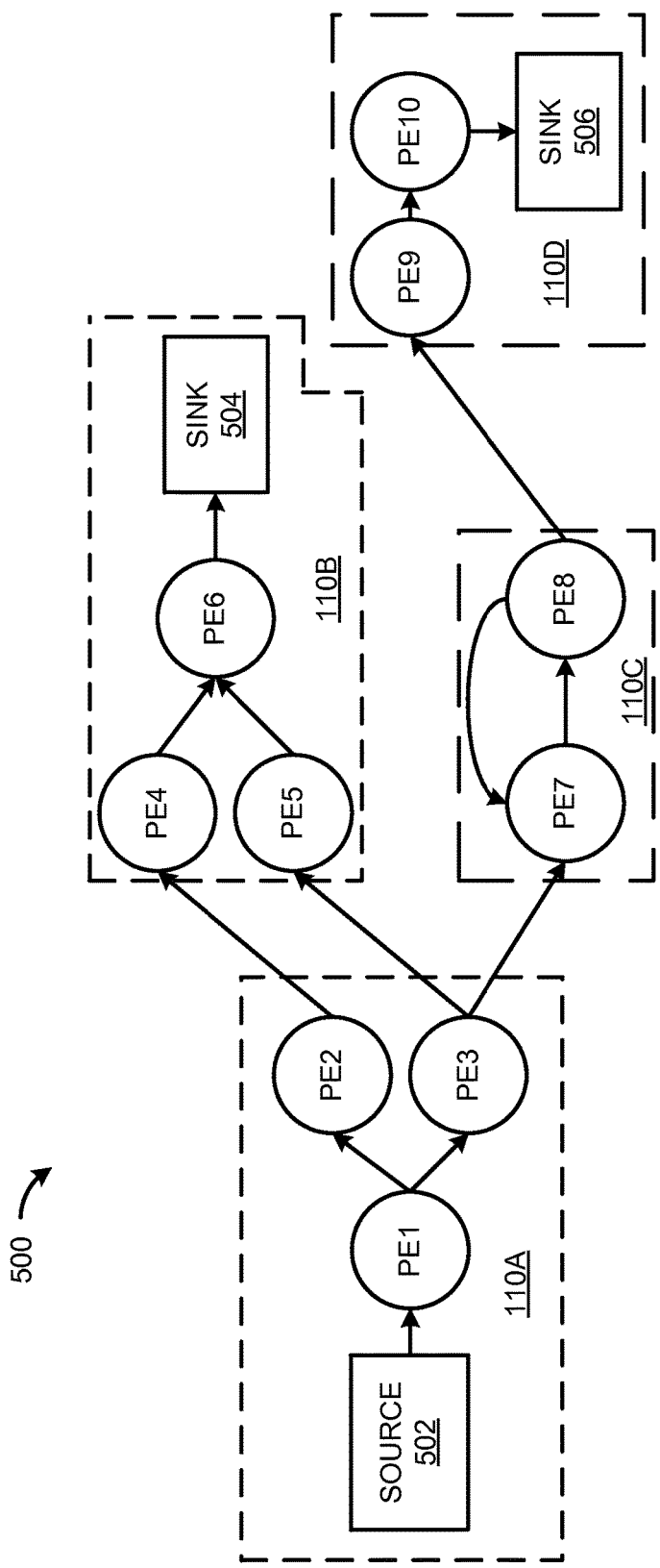
FIG. 5 illustrates an operator graph for a stream computing application, according to various embodiments.

FIG. 5 illustrates an exemplary operator graph 500 for a stream computing application beginning from one or more sources 502 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 502 and ends at a sink 504, 506. Compute node 110A includes the processing elements PE1, PE2, and PE3. Source 502 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to PE6 before being transmitted to a sink 504. Similarly, tuples flowing from PE3 to PE5 also reach PE6 and are sent to a sink 504. Thus, PE6 could be configured to perform a join operation, combining tuples received from PE4 and PE5, before sending the data to the sink 504, discussed further in FIG. 6. In certain embodiments, a join operation may include dynamically adjusting the windows for two different tuple streams being joined at a processing element (e.g., PE6). This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in PE10 before being sent to a sink 506.

The tuple received by a particular processing element 235 (FIG. 2) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes as a corresponding input tuple may be referred to herein as the same tuple.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, change the deployment of an operator graph, e.g., operator graph 132, and collect memory data. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D based on memory data.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

Figure 6:
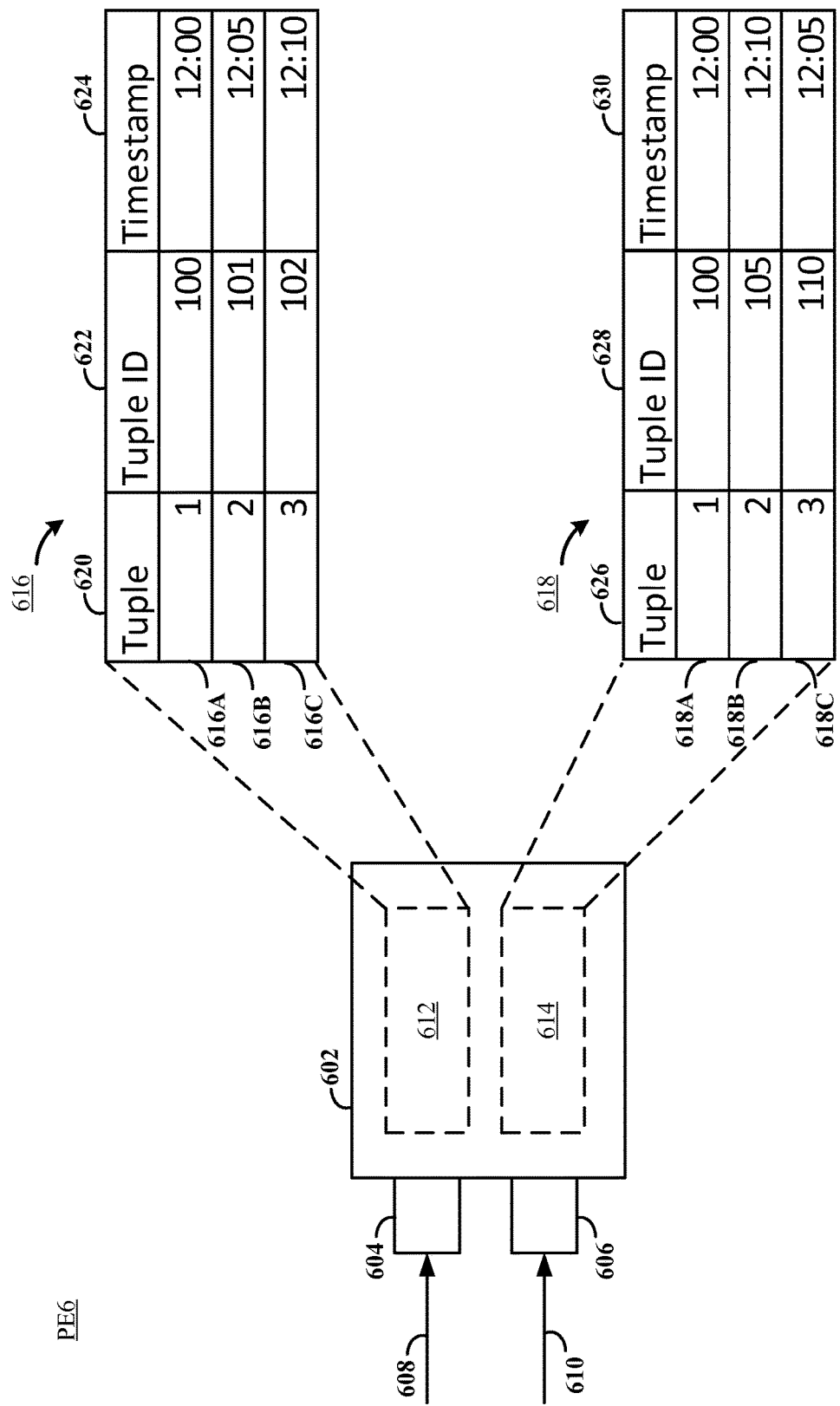
FIG. 6 illustrates a more detailed view of PE6 from the operator graph of FIG. 5, according to various embodiments.

FIG. 6 illustrates a more detailed view of PE6 from the operator graph of FIG. 5, according to various embodiments. The PE6 includes a stream operator 602 with input ports 604 and 606 receiving a first stream 608 and a second stream 610, respectively. The stream operator 602 includes a first window 612 corresponding to the first stream 608 and a second window 614 corresponding to the second stream 610. The first window 612 corresponds with a first table 616 and the second window 614 corresponds with a second table 618. The first and second tables 616/618 are illustrative representations of the tuples received from the streams 608 and 610 and accumulated within the windows 612 and 614, respectively.

In certain embodiments, the stream operator 602 may have at least one input port. The stream operator 602 may have a plurality of windows each corresponding to a specific input port. In other embodiments, the stream operator 602 may receive at least one stream. In some embodiments, the stream operator 602 may be a join operator. The first window 612 and the second window 614 may correspond with memory. In various embodiments, the memory corresponding to the first window 612 and the second window 614 may be within the stream operator 602. For example, an amount of memory from the stream operator 602 may be allocated for the tuples accumulated in the first window 612 from the first stream 608 and an amount of memory from the stream operator 602 may be allocated for the tuples accumulated in the second window 614 from the second stream 610. For example, the first window 612 and the second window 614 may each have dedicated virtual memory for storing tuples received from the first stream 608 and the second stream 610, respectively. In certain embodiments, the memory corresponding to the first window 612 and the second window 614 may be shared amongst a plurality of stream operators (not shown) within the PE6. In further embodiments, the first window 612 and the second window 614 may be joined as a singular window with portioned and allocated memory space for designated input ports.

The first and second tables 616/618 are used for illustrative purposes and do not necessarily show the exact mechanism or process through which a stream operator (e.g., stream operator 602) may accumulate and store tuples or data temporarily. The first and second tables 616/618 may include a plurality of columns 620-624 and 626-630 and may include a plurality of rows 616A-C and 618A-C, respectively. In the example shown in FIG. 6, each row in tables 616/618 corresponds to a different tuple received by the stream operator 602 from the first stream 608 or the second stream 610, respectively. Additionally, in the example shown in FIG. 6, each column stores the tuple data. In various embodiments, tuple data may include attributes as well as metadata pertaining to the tuple. For example, the first columns 620 and 626 may store the data from the tuples received from the first stream 608 and the second stream 610. In various embodiments, the tuples stored in the first columns 620 and 626 may include a plurality of attributes which comprise the tuples. The second columns 622 and 628 may store metadata related to the tuples, such as a tuple identification (ID) number. The tuple ID number may be a numerical value that identifies a particular tuple. In certain embodiments, the attributes which are part of the tuple may each have an assigned identification number. The third columns 624 and 630 may store a timestamp corresponding to when a tuple was generated. In embodiments, the timestamp may correspond to when a tuple was most recently updated.

The sizes of the first window 612 and the second window 614 may be defined by the eviction policy. In certain embodiments, the sizes of the first window 612 and the second window 614 may be altered when the parameters defining the join threshold have not been met (e.g., tuples stored in the first window 612 and the second window 614 match with each other 75% of the time whereas the join threshold was 85%). In some embodiments, the match determinations (e.g., calculating match tuple and/or attribute match percentages) may be performed when the eviction policy has been triggered (e.g., for an eviction policy set at 5 minutes, when 5 minutes has passed). In various embodiments, first window 612 and the second window 614 may each have a separate eviction policy and/or join threshold.

For example, the first window 612 and the second window 614 may both have a different eviction policy, such as 5 minutes for the first window 612 and 3 minutes for the second window 614. Similarly, continuing the example, the first window 612 may have a join threshold of 90% whereas the second window 614 may have a join threshold of 99%. In some embodiments, the first window 612 and the second window 614 may share the same eviction policy but have different join thresholds. In further embodiments, the first window 612 and the second window 614 may share the same join threshold but have different eviction policies.

In an example, the first window 612 and the second window 614 may share an eviction policy of 10 minutes and a join threshold of 85% (e.g., 85% of tuples stored in the first window 612 and the second window 614 must have a match). The stream operator 602 may analyze the tuples from the first stream 608 and the second stream 610 to determine whether or not they match. For instance, the tuple ID may be used to determine if the tuples from the first stream 608 and the tuples from the second stream 610 match. In certain embodiments, a match may require that the tuple IDs from the first stream 608 and the second stream 610 match outright numerically (e.g., a tuple ID of 70918 from the first stream matches a tuple ID of 70918 from the second stream.) In some embodiments, the match may require that the tuple IDs from the first stream 608 and the second stream 610 belong to a range of tuple ID numbers (e.g., for a range of 100 IDs, a tuple ID of 70918 from the first stream matches a tuple ID of 71018). When 10 minutes expires, if the tuples stored in the first window 612 and the second window 614 have a match percentage of 80%, the first window 612 and/or the second window 614 may be made larger to achieve the desired join threshold of 85%.

In other embodiments, attributes may be used in the same or similar manner that tuples are used for match determinations. For example, attribute identification numbers, an attribute identification number range and/or attribute metadata (e.g., a string value characterizing the attribute) can be used to determine a match.

Thus, the tuples stored in the first window 612 from the first stream 608, such as the first tuple (e.g., row 616A), the second tuple (e.g., row 616B), and the third tuple (e.g., row 616C), may be compared with the tuples stored in the second window 614 from the second stream 610, such as the first tuple (e.g., row 618A), the second tuple (e.g., row 618B), and the third tuple (e.g., 618C).

Continuing the example above where the eviction policy was 10 minutes and the join threshold was 85%, if the match determination for the join threshold requires that the tuple IDs from the first stream 608 and the second stream 610 match numerically, then the stream operator 602 may determine that the tuples stored in the first window 612 and the second window 614 do not meet the join threshold because although the tuple IDs from rows 616A and 618A match numerically, the tuple IDS from rows 616B/C and 618B/C do not (e.g., resulting in a 33% match percentage). Therefore, the size of the first window 612 and second window 614 may be altered to meet the desired join threshold value. For instance, the eviction policy of the first window 612 may be made longer (e.g., 15 minutes) to accumulate fewer tuples and increase the likelihood that the join threshold may be met.

In another variation of the example above where the eviction policy was 10 minutes and the join threshold was 85%, if the match determination for the join threshold requires that the tuple IDs from the first stream 608 and the second stream 610 fall within an ID range, such as 100-105, then the stream operator 602 may determine that the tuples stored in the first window 612 and the second window 614 do not meet the join threshold because the tuple IDs in rows 616C and 618C do not both fall within the ID range to constitute a match of 85%. Therefore, the eviction policy of the second window may be made longer to accumulate more tuples and increase the likelihood of meeting the join threshold.

In various embodiments, the first window 612 and the second window 614 may be adjusted when tuples are accumulated out of order. In another variation of the examples above, the stream operator 602 may have an eviction policy of 5 minutes beginning at 12:00 and a join threshold of 85%, where the match determination for the join threshold requires that the tuple ID numbers from the first stream 608 and the second stream 610 match numerically. Additionally, although depicted, for the sake of example, it will be assumed that the tuples listed in the first table 616 and the second table 618 are accumulated and stored within their respective tables according to the time listed in the timestamp columns 624 and 630. Thus, at 12:05 when the eviction policy is triggered, the join threshold has not been met because the tuple ID number from row 616B has no corresponding match (e.g., the tuple from row 618B has not been stored yet). Therefore, the stream operator 602 may alter the eviction policy to increase the size of the window to 10 minutes to allow for the data which was received out of order to be grouped and processed together.

Figure 7:
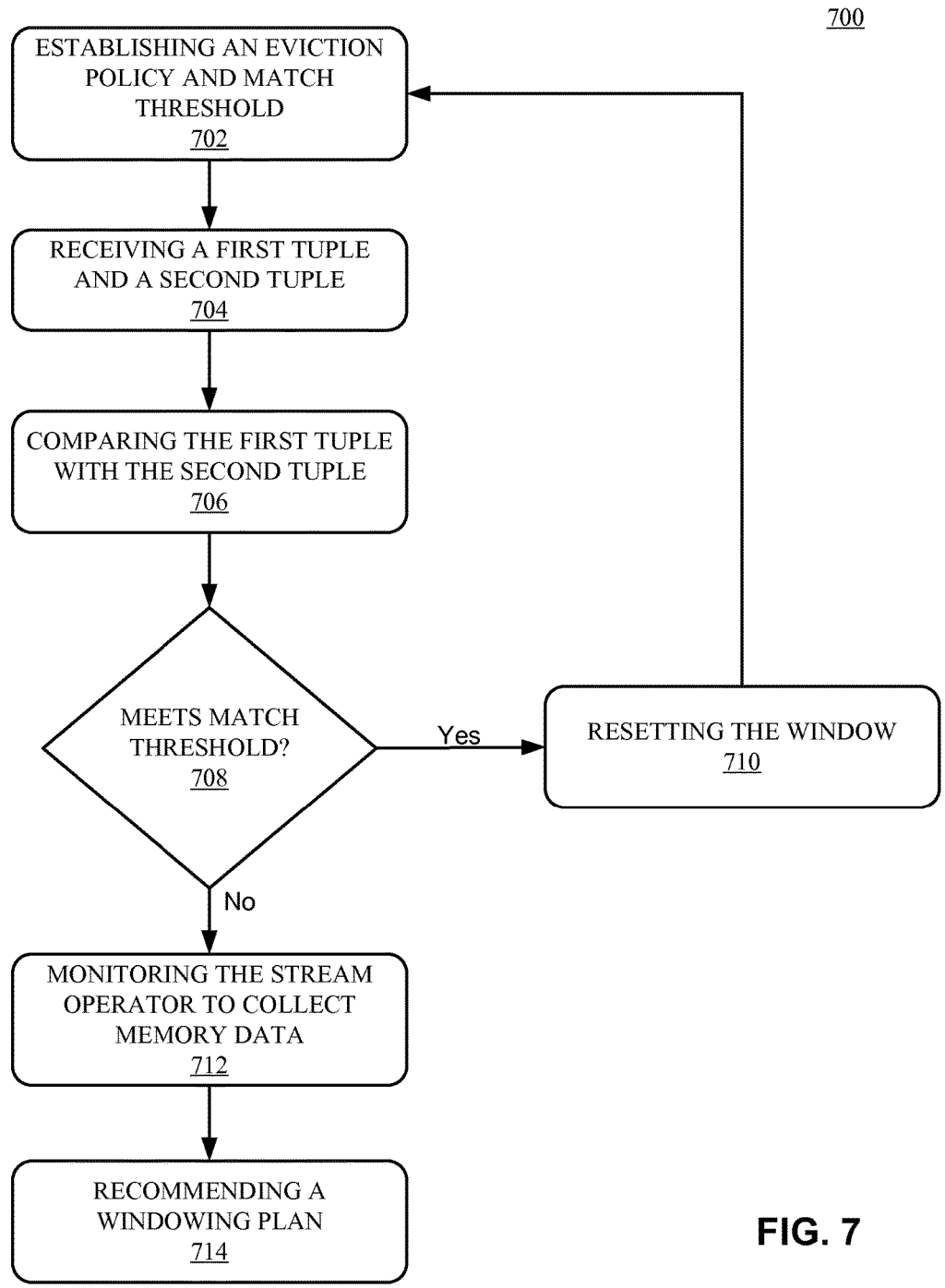
FIG. 7 illustrates one embodiment of an example process for a dynamic window in a streaming environment, according to various embodiments.

FIG. 7 illustrates one embodiment of an example process 700 for a dynamic window in a streaming environment, according to various embodiments. The process 700 may be performed by a stream manager, such as the stream manager 134 from FIG. 1. In certain embodiments, the process 700 may be performed by a processor in a compute node, such as compute node 110. It is to be understood that the order in which the blocks described below are discussed is not to be construed as limiting the order in which the individual acts may be performed. In particular, the acts performed may be performed simultaneously or in a different order than that discussed.

The process may begin at block 702, where an eviction policy and a join threshold are established for a stream operator. In some embodiments, the eviction policy and/or join threshold may be predetermined based upon previous implementation of the process 700. For example, if a join threshold and eviction policy have been previously used by the process 700, those parameters may be utilized to begin the process 700. In various embodiments, the eviction policy and/or join threshold may be user defined. The eviction policy may be time based and/or based on a tuple flow count. For example, the eviction policy may be based on the number of tuples stored within each window. In other embodiments, the eviction policy can be based on a delta value within an attribute and/or attributes of a tuple. For example, a change in value in an attribute greater than a delta of "X" can cause the eviction policy to execute.

The stream operator may have at least one window to accumulate and store tuples received from at least one input port. In certain embodiments, the stream operator may have a different window designated for different input ports. In further embodiments, each window within the stream operator may have a minimum window size (e.g., 5 minutes, 10 tuples) as well as a maximum window size (e.g., 10 minutes, 100 tuples). In some embodiments, establishing an eviction policy and a join threshold may include defining when the join threshold is calculated. For example, a user may define the process 700 to perform a match determination after 100 tuples have been received. In another example, a user may define the process 700 to perform a match determination after a certain amount of time has passed. For instance, if the eviction policy is 10 minutes, a user may define the process 700 to perform a match determination at 5 minutes. If, at 5 minutes, the match percentages are equivalent to or exceed the join threshold, a user may define the process 700 to trigger the eviction policy. However, if, at 5 minutes, the match percentages have not met the desired join threshold, the process 700 may wait until 10 minutes has passed before determining the match percentages.

At block 704, the stream operator receives a first tuple and a second tuple. In some embodiments, receiving the first tuple and the second tuple may include receiving a first set of attributes included in the first tuple and a second set of attributes included in the second tuple. In various embodiments, receiving the first tuple and the second tuple may include storing the first tuple in a first window within the stream operator and storing the second tuple in a second window within the same stream operator. In certain embodiments, the first tuple and the second tuple may be stored within the same window, where the singular window has allocated memory space (e.g., virtual memory) to separate and store the first tuple and the second tuple.

At block 706, the first tuple and the second tuple are compared by the stream manager in a match determination. In various embodiments, comparing the first tuple and the second tuple may occur according to the eviction policy. For example, the first tuple and the second tuple may be compared when 5 minutes has passed. In some embodiments, comparing the first tuple and the second tuple may include using the metadata (e.g., serial number) of the first tuple and the metadata of the second tuple to determine a level of equivalency (e.g., match). For example, if the match determination requires that the first tuple and the second tuple have serial numbers within a range, the serial number of the first tuple and the serial number of the second tuple will be compared to the range to determine whether or not they match. In some embodiments, the result of the comparison may be recorded and stored as memory data, discussed further herein. In various embodiments, attributes from tuples may be used in the same or similar manner as are tuples for a match determination.

At block 708, the stream manager determines whether or not the results from block 706 meet the join threshold. If the results from the match determination meet the join threshold and the eviction policy has been triggered, the stream operator and/or stream manager may apply processing logic to the first tuple stored in the first window and the second tuple stored in the second window, and the window is reset at block 710. Resetting the window at block 710 may include accumulating and storing new tuples as they are received by the stream operator. If the results from the match determination do not meet the join threshold and the eviction policy has been triggered, the stream operator may be monitored to collect memory data at block 712.

At block 712, the stream operator may be monitored by a stream manager to collect memory data. In various embodiments, monitoring the stream operator may include monitoring a plurality of operators within a processing element implementing the process 700. In certain embodiments, memory data may be information corresponding to the amount of computing resources (e.g., virtual memory) allocated to a window within a stream operator. The memory data may be utilized in operations during the process 700 by the stream manager to allocate and/or limit computing resources distributed to stream operators.

At block 714, a windowing plan may be recommended. In certain embodiments, recommending a windowing plan may include utilizing memory data to alert a user about the current status of the stream operator. Alerting a user may include a recommendation to change the eviction policy and/or join threshold. For example, if tuples have been accumulated within a first window and a second window with desired match percentages before the eviction policy has been triggered, the eviction policy may be too long for the first window, wasting computing resources. A recommendation to alter the eviction policy (e.g., make the first window smaller) and/or join threshold (e.g., lower the join threshold) may be sent to a user through a GUI to limit performance degradation and distribute unused computing resources. In certain embodiments, the stream manager may automatically adjust the size of the window and/or windows to conform with desired join thresholds and/or eviction policies. Automatically adjusting the size of the window may include adjusting the sizes of multiple windows within the stream operator. In further embodiments, automatically adjusting the size of the window/windows may be based in part on the memory data collected over previous implementations of the process 700.

In certain embodiments, recommending the windowing plan may include displaying the windowing plan to a user through a GUI. A windowing plan may include a recommendation to alter each window within the stream operator. For example, a windowing plan may recommend to make the first window bigger and the second window smaller. In some embodiments, displaying the windowing plan may include a pictorial representation of the original stream operator parameters next to a pictorial representation of the recommended stream operator parameters. The pictorial representations of the original stream operator parameters and the recommended stream operator parameters may be interacted with by a user such that, if a user wishes to alter the recommended stream operator parameters, the user may alter the recommended stream operator parameters and view the projected computing resource allocations through the GUI.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

Aspects of the disclosure provide a method, system, and computer program product for dynamic window adjustments in a streaming environment. The method, system, and computer program product can include receiving at a first stream operator, a first tuple including a first set of attributes to be stored in a first window and a second tuple including a second set of attributes to be stored in a second window. In various embodiments, the first window and the second window can each have an eviction policy. In response to triggering the eviction policy for the first window and the second window, the first tuple stored in the first window can be compared with the second tuple stored in the second window. Based upon the comparing, it can be determined that the first tuple and the second tuple go outside of a join threshold. In response to determining that the first tuple and the second tuple go outside of a join threshold, the eviction policy of the first window can be altered.

In some embodiments, the method, system, and computer program product can further include receiving, at the first stream operator and from the stream of tuples, a third tuple to be stored in the first window in response to altering the eviction policy of the first window. The third tuple can have a third set of attribute. In response to triggering the eviction policy of the first and second windows, the third tuple stored in the first window can be compared to the second tuple stored in the second window. Based on the comparing, it can be determined that the third tuple and the second tuple go outside of a join threshold. In response to determining that the third tuple and the second tuple go outside of a join threshold, the eviction policy of the second window can be altered.

What is claimed is:

1. A method for dynamic window adjustments in a streaming environment, the method comprising:
receiving one or more streams of tuples to be processed by a plurality of processing elements operating on one or more computer processors, each processing element having one or more stream operators, the one or more stream operators including code configured to output the tuples to one or more other stream operators, the processing elements forming an operator graph in which the tuples flow between the one or more stream operators, the operator graph defining one or more execution paths for processing and routing the stream of tuples, each processing element having an associated memory space;
receiving at a first stream operator, from a first stream of tuples, a first set of one or more tuples to be stored in a first window and, from a second stream of tuples, a second set of one or more tuples to be stored in a second window, the first set of tuples including a first tuple and the second set of tuples including a second tuple, the first window and the second window each having an eviction policy, and wherein each tuple in the first set of tuples and each tuple in the second set of tuples includes a respective set of attributes;
comparing, in response to triggering the eviction policy for the first window and the second window, respective attributes of tuples in the first set of tuples stored in the first window with respective attributes of tuples in the second set of tuples stored in the second window to determine a match percentage of tuples in the first set of tuples that match a corresponding tuple in the second set of tuples based on the respective attributes of tuples in the first and second windows, wherein the first stream operator is configured to perform a join operation on matching tuples;
comparing the match percentage to a join threshold, wherein the join threshold is a threshold percentage of tuples from the first set of tuples having a matching tuple in the second set of tuples;
determining that, based upon the comparing, the match percentage goes outside of the join threshold;
altering, in response to the determining, a time duration of the eviction policy of the first window such that the match percentage satisfies the join threshold within the time duration of the eviction policy; and
joining, in response to determining that the match percentage satisfies the join threshold, matching tuples from the first and second sets of tuples.

2. The method of claim 1, wherein the eviction policy for the first window and the second window are the same prior to the altering, wherein prior to the altering, the first window and the second window exist during a same period of time, and wherein the first window has a first dedicated virtual memory space and the second window has a second dedicated virtual memory space.

3. The method of claim 1, further comprising:
in response to altering the eviction policy of first window, receiving at the first stream operator, from the first stream of tuples, a third tuple to be stored in the first window, the third tuple including a third set of attributes;
comparing, in response to triggering the eviction policy of the first window and the second window, the third tuple stored in the first window with the second tuple stored in the second window;
determining that, based upon the comparing, that the third tuple and the second tuple do not match; and
altering, in response to the determining, the eviction policy of the second window.

4. The method of claim 1, further including:
monitoring the first stream operator;
collecting, in response to altering the eviction policy of the first window, memory data corresponding to the first window and the second window, the memory data including an amount of computing resources allocated to the first window and the second window, the computing resources including virtual memory; and
recommending, based upon the memory data, a windowing plan for the first window and the second window.

5. The method of claim 1, wherein the join threshold is a minimum percentage of tuples from the first set of tuples having a matching tuple in the second set of tuples,
wherein the determining that the match percentage goes outside of the join threshold includes determining that the match percentage exceeds the join threshold, and
wherein the altering the time duration of the eviction policy of the first window includes decreasing the time duration of the eviction policy.

6. The method of claim 1, wherein the determining that the match percentage goes outside of the join threshold includes determining that the match percentage is below the join threshold, and
wherein the altering the time duration of the eviction policy of the first window includes increasing the time duration of the eviction policy.

7. The method of claim 1, wherein the second window has a second join threshold, the method further comprising:
altering, in response to determining that the match percentage goes outside of the join threshold, the join threshold.

8. The method of claim 1, wherein the comparing respective attributes of tuples in the first set of tuples stored in the first window with respective attributes of tuples in the second set of tuples stored in the second window comprises:
identifying the first tuple in the first set of tuples, the first tuple having a first tuple ID;
identifying the second tuple in the second set of tuples, the second tuple having a second tuple ID;
comparing the first tuple ID to the second tuple ID; and
determining, based on the comparing the first tuple ID to the second tuple ID, whether the first tuple matches the second tuple, wherein the first tuple matches the second tuple if the first tuple ID is identical to the second tuple ID.

9. The method of claim 1, wherein the comparing respective attributes of tuples in the first set of tuples stored in the first window with respective attributes of tuples in the second set of tuples stored in the second window comprises:
identifying the first tuple in the first set of tuples, the first tuple having a first tuple ID, the first tuple ID being a numerical identifier for the first tuple;
identifying the second tuple in the second set of tuples, the second tuple having a second tuple ID, the second tuple ID being a numerical identifier for the second tuple;
comparing the first tuple ID to the second tuple ID; and
determining, based on the comparing the first tuple ID to the second tuple ID, whether the first tuple matches the second tuple, wherein the first tuple matches the second tuple if the first tuple ID is within a predetermined range of the second tuple ID.

10. The method of claim 9, wherein the first stream operator receives the first stream of tuples at a first input port and the second stream of tuples at a second input port.

11. The method of claim 1, wherein the comparing respective attributes of tuples in the first set of tuples stored in the first window with respective attributes of tuples in the second set of tuples stored in the second window comprises:
   identifying the first tuple in the first set of tuples, the first tuple having a first attribute with a first attribute metadata, the first attribute metadata being a string value that characterizes the first attribute;
   identifying the second tuple in the second set of tuples, the second tuple having a second attribute with a second attribute metadata, the second attribute metadata being a string value that characterizes the second attribute;
   comparing the first attribute metadata to the second attribute metadata; and
   determining, based on the comparing the first attribute metadata to the second attribute metadata, whether the first tuple matches the second tuple.

12. A computer program product for storing tuples in a streaming environment, the computer program product comprising a computer readable storage medium having program instructions embodied therewith, wherein the computer readable storage medium is not a transitory signal per se, the program instructions executable by a processor to cause the processor to perform a method comprising:
   receiving one or more streams of tuples to be processed by a plurality of processing elements operating on one or more computer processors, each processing element having one or more stream operators, the one or more stream operators including code configured to output the tuples to one or more other stream operators, the processing elements forming an operator graph in which the tuples flow between the one or more stream operators, the operator graph defining one or more execution paths for processing and routing the stream of tuples, each processing element having an associated memory space;
   receiving at a first stream operator, from a first stream of tuples, a first set of one or more tuples to be stored in a first window and, from a second stream of tuples, a second set of one or more tuples to be stored in a second window, the first set of tuples including a first tuple and the second set of tuples including a second tuple, the first window and the second window each having an eviction policy, and wherein each tuple in the first set of tuples and each tuple in the second set of tuples includes a respective set of attributes;
   comparing, in response to triggering the eviction policy for the first window and the second window, respective attributes of tuples in the first set of tuples stored in the first window with respective attributes of tuples in the second set of tuples stored in the second window to determine a match percentage of tuples in the first set of tuples that match a corresponding tuple in the second set of tuples based on the respective attributes of tuples in the first and second windows, wherein the first stream operator is configured to perform a join operation on matching tuples;
   comparing the match percentage to a join threshold, wherein the join threshold is a threshold percentage of tuples from the first set of tuples having a matching tuple in the second set of tuples;
   determining that, based upon the comparing, the match percentage goes outside of the join threshold;
   altering, in response to the determining, a time duration of the eviction policy of the first window such that the match percentage satisfies the join threshold within the time duration of the eviction policy; and
   joining, in response to determining that the match percentage satisfies the join threshold, matching tuples from the first and second sets of tuples.

13. The computer program product of claim 12, further comprising:
   in response to altering the eviction policy of first window, receiving at the first stream operator, from the first stream of tuples, a third tuple to be stored in the first window, the third tuple including a third set of attributes;
   comparing, in response to triggering the eviction policy of the first window and the second window, the third tuple stored in the first window with the second tuple stored in the second window;
   determining that, based upon the comparing, that the third tuple and the second tuple do not match; and
   altering, in response to the determining, the eviction policy of the second window.

14. The computer program product of claim 12, further including:
   monitoring the first stream operator;
   collecting, in response to altering the eviction policy of the first window, memory data corresponding to the first window and the second window, the memory data including an amount of computing resources allocated to the first window and the second window, the computing resources including virtual memory; and
   recommending, based upon the memory data, a windowing plan for the first window and the second window.

15. The computer program product of claim 14, wherein recommending the windowing plan includes displaying the windowing plan to a user through a graphical user interface.

16. A computer system for storing tuples in a streaming environment, the computer system comprising:
   a memory; and
   a processor in communication with the memory, wherein the processor is configured to perform a method, the method comprising:
   receiving one or more streams of tuples to be processed by a plurality of processing elements operating on one or more computer processors, each processing element having one or more stream operators, the one or more stream operators including code configured to output the tuples to one or more other stream operators, the processing elements forming an operator graph in which the tuples flow between the one or more stream operators, the operator graph defining one or more execution paths for processing and routing the stream of tuples, each processing element having an associated memory space;
   receiving at a first stream operator, from a first stream of tuples, a first set of one or more tuples to be stored in a first window and, from a second stream of tuples, a second set of one or more tuples to be stored in a second window, the first set of tuples including a first tuple and the second set of tuples including a second tuple, the first window and the second window each having an eviction policy, and wherein each tuple in the first set of tuples and each tuple in the second set of tuples includes a respective set of attributes;

comparing, in response to triggering the eviction policy for the first window and the second window, respective attributes of tuples in the first set of tuples stored in the first window with respective attributes of tuples in the second set of tuples stored in the second window to determine a match percentage of tuples in the first set of tuples that match a corresponding tuple in the second set of tuples based on the respective attributes of tuples in the first and second windows, wherein the first stream operator is configured to perform a join operation on matching tuples;

comparing the match percentage to a join threshold, wherein the join threshold is a threshold percentage of tuples from the first set of tuples having a matching tuple in the second set of tuples;

determining that, based upon the comparing, the match percentage goes outside of the join threshold; and altering, in response to the determining, a time duration of the eviction policy of the first window such that the match percentage satisfies the join threshold within the time duration of the eviction policy; and joining, in response to determining that the match percentage satisfies the join threshold, matching tuples from the first and second sets of tuples.

17. The computer system of claim 16, wherein the eviction policy is user defined.

18. The computer system of claim 16, wherein the eviction policy for the first window and the second window are the same prior to the altering, wherein prior to the altering, the first window and the second window exist during a same period of time, and wherein the first window has a first dedicated virtual memory space and the second window has a second dedicated virtual memory space.

19. The computer system of claim 16, further comprising:

in response to altering the eviction policy of first window, receiving at the first stream operator, from the first stream of tuples, a third tuple to be stored in the first window, the third tuple including a third set of attributes;

comparing, in response to triggering the eviction policy of the first window and the second window, the third tuple stored in the first window with the second tuple stored in the second window;

determining that, based upon the comparing, that the third tuple and the second tuple do not match; and altering, in response to the determining, the eviction policy of the second window.

20. The computer system of claim 16, further including:

monitoring the first stream operator;

collecting, in response to altering the eviction policy of the first window, memory data corresponding to the first window and the second window, the memory data including an amount of computing resources allocated to the first window and the second window, the computing resources including virtual memory; and recommending, based upon the memory data, a windowing plan for the first window and the second window.

* * * * *